US006943517B2

(12) United States Patent
Yoshitomi et al.

(10) Patent No.: US 6,943,517 B2
(45) Date of Patent: Sep. 13, 2005

(54) SINGLE PHASE MOTOR DRIVING CIRCUIT AND SINGLE PHASE MOTOR DRIVING METHOD

(75) Inventors: Tetsuya Yoshitomi, Gunma (JP); Yasuyuki Ueshima, Gunma (JP)

(73) Assignee: Sanyo Electronic Co., Ltd., Osaka (JP)

( * ) Notice: Subject to any disclaimer, the term of this patent is extended or adjusted under 35 U.S.C. 154(b) by 132 days.

(21) Appl. No.: 10/699,443

(22) Filed: Oct. 30, 2003

(65) Prior Publication Data

US 2005/0052147 A1 Mar. 10, 2005

(30) Foreign Application Priority Data

Oct. 31, 2002 (JP) ...................................... 2002-317597

(51) Int. Cl.[7] .................................................. G05B 5/00

(52) U.S. Cl. ....................................... 318/471; 318/934

(58) Field of Search ................................ 318/471, 599, 318/603, 671, 685, 254, 634, 783; 388/934

(56) References Cited

U.S. PATENT DOCUMENTS 6,476,579 B1 * 11/2002 Akahane et al. ............ 318/696

2002/0167565 A1 * 11/2002 Maeda et al. ................. 347/40

FOREIGN PATENT DOCUMENTS

JP HEI3-74199 7/1991

* cited by examiner

*Primary Examiner*—Karen Masih

(74) *Attorney, Agent, or Firm*—SoCal IP Law Group LLP; Steven C. Sereboff

(57) ABSTRACT

A single-phase motor driving circuit includes a controller for outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than the detected temperature voltage at the time of starting the single-phase motor is set as an initial value. The controller sets the duty setting voltage as the starting duty setting voltage when the result of the comparison shows that the starting duty setting voltage is smaller than the detected temperature voltage, and the duty setting voltage as the detected temperature voltage when the starting duty setting voltage is larger than the detected temperature voltage.

11 Claims, 3 Drawing Sheets

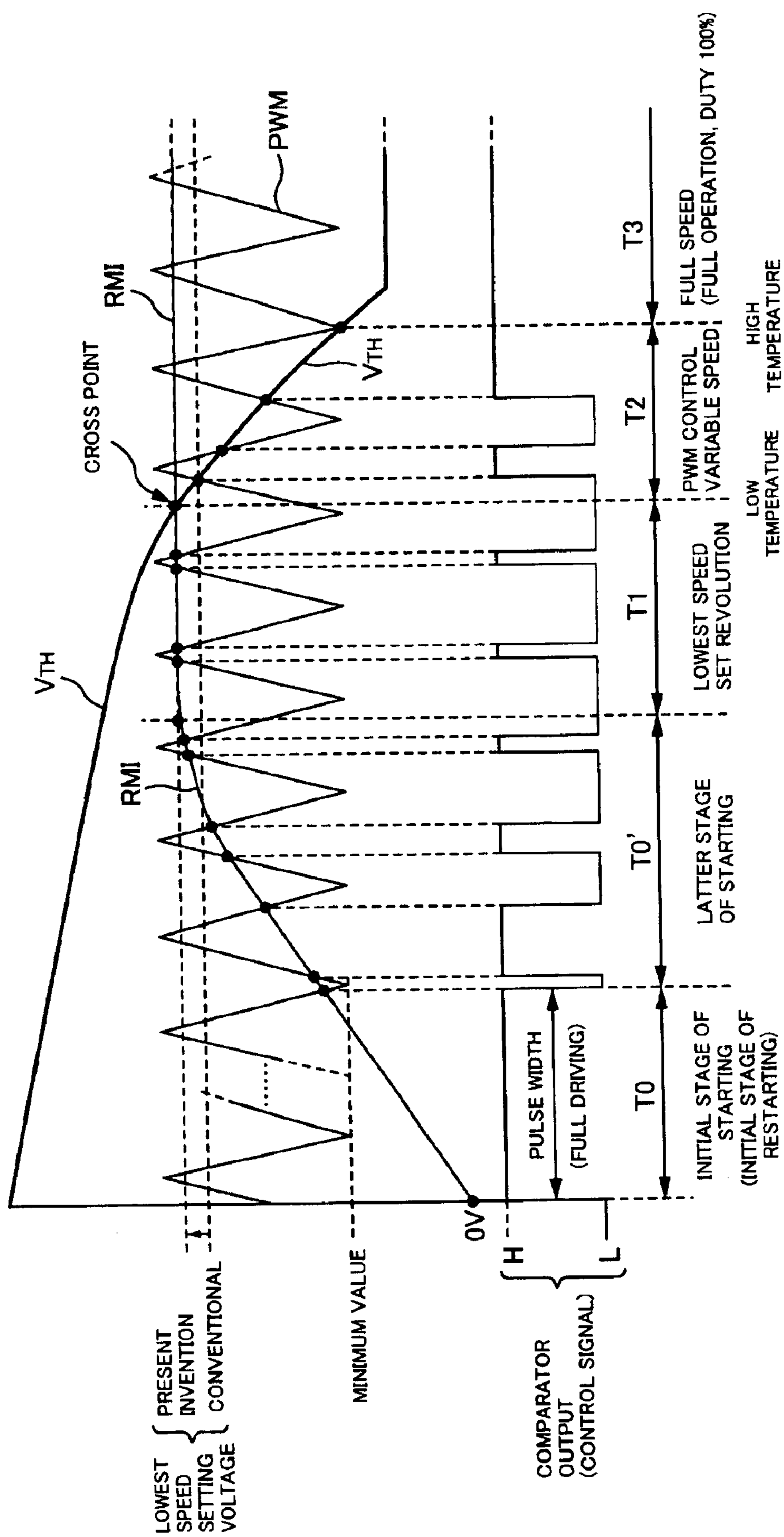
FIG. 3
CROSS POINT
RMI
PWM
$V_{TH}$
RMI
$V_{TH}$
LOWEST SPEED SETTING VOLTAGE
PRESENT INVENTION
CONVENTIONAL
MINIMUM VALUE
0V
H
L
COMPARATOR OUTPUT (CONTROL SIGNAL)
PULSE WIDTH
(FULL DRIVING)
T0
T0'
T1
T2
T3
INITIAL STAGE OF STARTING (INITIAL STAGE OF RESTARTING)
LATTER STAGE OF STARTING
LOWEST SPEED SET REVOLUTION
LOW TEMPERATURE
PWM CONTROL VARIABLE SPEED
HIGH TEMPERATURE
HIGH TEMPERATURE
FULL SPEED (FULL OPERATION, DUTY 100%)

SINGLE PHASE MOTOR DRIVING CIRCUIT AND SINGLE PHASE MOTOR DRIVING METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

The present application claims priority upon Japanese Patent Application No. 2002-317597 filed on Oct. 31, 2002, which is herein incorporated by reference.

BACKGROUND OF THE INVENTION

1. Field of the Invention

The present invention relates to a single-phase motor driving circuit, and a single-phase motor driving method.

2. Description of Related Art

For example, in a motor driving system disclosed in Japanese Utility Model Application Laid-Open Publication No. Hei3-74199, a comparator outputs a pulse signal (control signal) of "H" for driving a motor based on a saw-tooth wave voltage generated in accordance with a phase switching signal. A detected temperature voltage based on a temperature detected by a thermistor is inputted to the comparator as a comparison input relative to the saw-tooth wave voltage. That is, the comparator outputs the pulse signal of "H" in a period in which the saw-tooth wave voltage is larger than the detected temperature voltage.

The detected temperature voltage fluctuates in a certain range in accordance with a change in temperature detected by the thermistor. Thus, a width of the pulse signal of "H" outputted by the comparator is widened or narrowed in accordance with the change in the temperature detected by the thermistor. That is, the widening/narrowing of the width of the pulse signal can vary a revolution speed of the motor.

If a minimum value of the detected temperature voltage is larger than that of the saw-tooth wave voltage, a period in which an output of the comparator always becomes "L" is inevitably generated irrespective of the change in temperature detected by the thermistor, as shown in FIG. 4 of Japanese Utility Model Application Laid-Open Publication No. Hei3-74199. Consequently, the motor cannot be revolved at a full speed.

A particular situation is now assumed in which a temperature detected by the thermistor is low to increase a detected temperature voltage, and a width of a pulse signal of "H" outputted by the comparator becomes the narrowest. In this case, a maximum value of a detected temperature voltage is set large so that a revolution speed of the single-phase motor can be reduced more, i.e., a minimum revolution speed can be set as low as possible. Alternatively, a voltage for revolution at a lowest speed (lowest speed setting voltage) is set large in place of the detected temperature voltage. Then, when starting the single-phase motor in a stopped state (including restarting), the width of the pulse signal of the comparator is too narrow to obtain a necessary driving duty, and thus the motor cannot be started. Therefore, it is impossible to set low a minimum value of a revolution speed of the single-phase motor.

SUMMARY OF THE INVENTION

According to one aspect of the present invention, a single-phase motor driving circuit comprises a controller for outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than the detected temperature voltage at the time of starting the single-phase motor is set as an initial value. The controller sets the duty setting voltage as the starting duty setting voltage when the result of the comparison shows that the starting duty setting voltage is smaller than the detected temperature voltage, and sets the duty setting voltage as the detected temperature voltage when the starting duty setting voltage is larger than the detected temperature voltage.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein:

FIG. 3 is a waveform chart showing a main signal in the single-phase motor driving circuit of the embodiment of the invention.

DETAILED DESCRIPTION OF THE INVENTION

Figure 1:
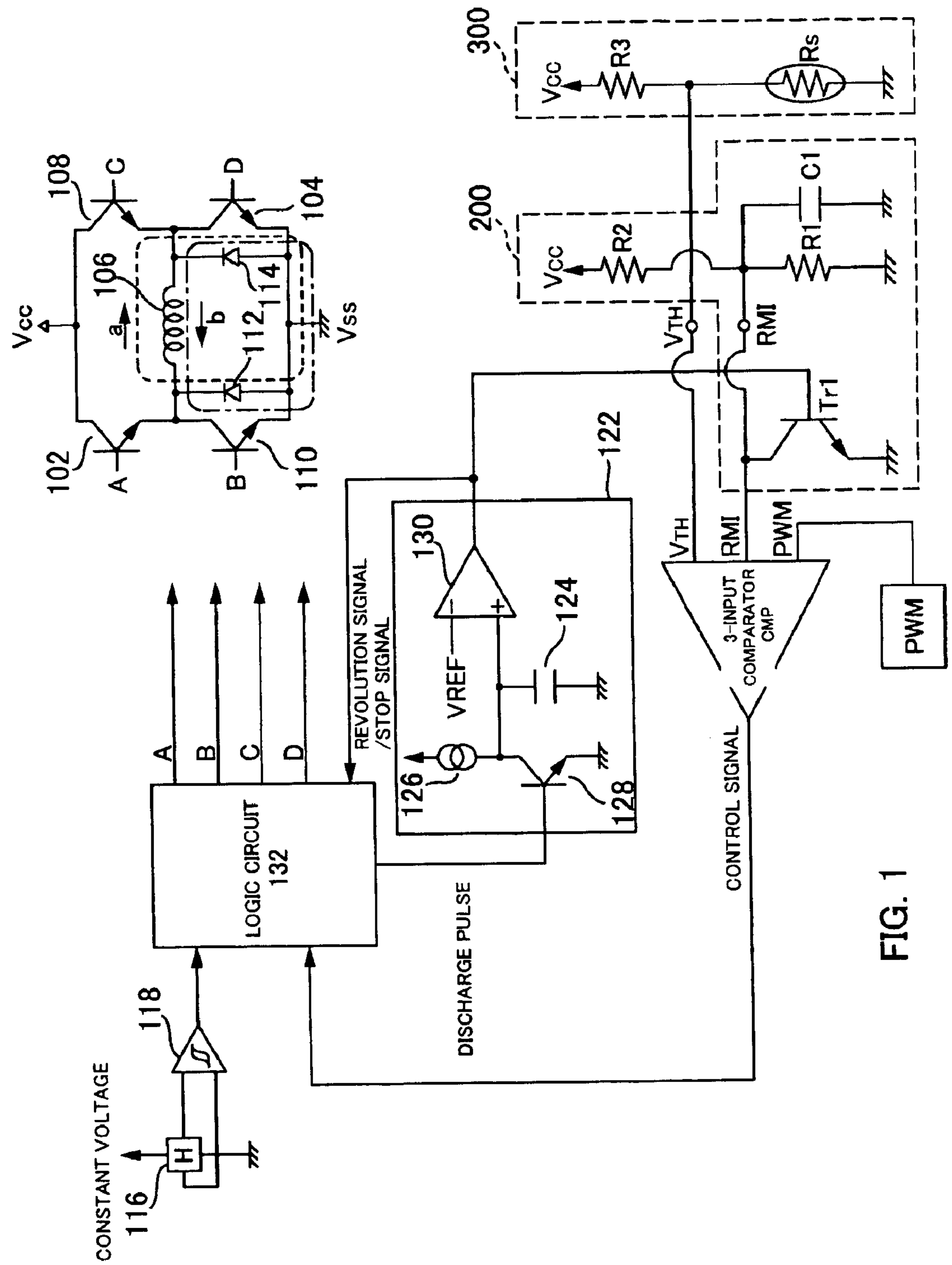
FIG. 1 is a circuit diagram showing a single-phase motor and its driving circuit according to an embodiment of the present invention.

At least the following matters will be made clear by the description in the present specification and the description of the accompanying drawings.

Brief Description of the Disclosure

A single-phase motor driving circuit according to an embodiment includes a controller for outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than the detected temperature voltage at the time of starting the single-phase motor is set as an initial value.

The controller sets the duty setting voltage as the starting duty setting voltage when the result of the comparison shows that the starting duty setting voltage is smaller than the detected temperature voltage, and the duty setting voltage as the detected temperature voltage when the starting duty setting voltage is larger than the detected temperature voltage.

The controller may be constructed in an integrated circuit.

The single-phase motor driving circuit may further include a section for generating the detected temperature voltage, a section for generating the starting duty setting voltage, and a section for generating the saw-tooth voltage.

The initial value of the starting duty setting voltage is preferably smaller than a minimum value of the saw-tooth voltage.

The section for generating the starting duty setting voltage has at least a capacitor, and a power source is connected to one end of the capacitor, while a switching device is connected to the end. The switching device is turned ON to discharge electricity from the capacitor when the single-phase motor is stopped, and the switching device is turned OFF to start charging the capacitor from the power source when the single-phase motor is started. A transitional rising voltage which appears at the end of the capacitor in the charging step may be the starting duty setting voltage.

The single-phase motor driving circuit can further include a logic section for generating a driving signal based on the control signal and outputting the generated driving signal the single-phase motor.

A single-phase motor driving method according to an embodiment includes the steps of: outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than the detected temperature voltage at the time of starting the single-phase motor is set as an initial value; setting the duty setting voltage as the starting duty setting voltage when the result of the comparison shows that the starting duty setting voltage is smaller than the detected temperature voltage; and setting the duty setting voltage as the detected temperature voltage when the starting duty setting voltage is larger than the detected temperature voltage.

Overall Constitution of Single-phase Motor Driving Circuit

Description will be made for an overall constitution of the single-phase motor driving circuit of the embodiment by referring to a circuit block diagram of FIG. 1. In the embodiment, it is assumed that the single-phase motor driving circuit is integrated, and peripheral circuit devices such as a single-phase coil are externally connected to the circuit.

As shown in FIG. 1, NPN type bipolar transistors 102, 104 receive driving signals A, D to supply driving currents in a right direction in the drawing ('a' direction) of a single-phase coil 106. Thus, a collector emitter path of the bipolar transistor 102, the single-phase coil 106 and a collector emitter path of the bipolar transistor 104 are serially connected between a power source VCC and a ground VSS. Similarly, NPN type bipolar transistors 108, 110 receive driving signals C, B to supply driving currents in a left direction in the drawing ('b' direction) of the single-phase coil 106. Thus, a collector emitter path of the bipolar transistor 108, the single-phase coil 106 and a collector emitter path of the bipolar transistor 110 are serially connected between the power source VCC and the ground VSS.

The bipolar transistors 102, 104 and the bipolar transistors 108, 110 are complementarily turned ON/OFF to properly change the directions of the driving currents of the single-phase coil 106, whereby the single-phase motor is revolved. A regenerative diode 112 regenerates a driving current when the direction of the driving current of the single-phase coil 106 is changed from the a direction to the b direction, and it is connected in parallel to the collector emitter path of the bipolar transistor 110. Similarly, a regenerative diode 114 regenerates a driving current when the direction of the driving current of the single-phase coil 106 is changed from the b direction to the a direction, and it is connected in parallel to the collector emitter path of the bipolar transistor 104.

Thus, when the bipolar transistors 102, 104 and the bipolar transistors 108, 110 are complimentarily turned ON/OFF to revolve the single-phase motor, a driving duty of the revolution is decided in accordance with a control signal outputted from a driving duty deciding comparator CMP. That is, a detected temperature voltage VTH, a starting duty setting voltage RMI, and a triangular wave signal (saw-tooth voltage) PWM are inputted to the driving duty deciding comparator CMP. The control signal outputted from the driving duty deciding comparator CMP is a pulse signal in which 25 kHz is a basic frequency. In other words, pulse width modulation (PWM) control is carried out for ON/OFF-driving of the bipolar transistors 102, 104 and the bipolar transistors 108, 110.

Therefore, as shown in FIG. 1, in a period in which the driving current is supplied to the single-phase coil 106 in the direction of an arrow a, the bipolar transistor 104 is always maintained in an ON state, while the bipolar transistor 102 is turned ON/OFF based on the basic frequency of 25 kHz. Conversely, in a period in which the driving current is supplied to the single-phase coil 106 in the direction of an arrow b, the bipolar transistor 110 is always maintained in an ON state, while the bipolar transistor 108 is turned ON/OFF based on the basic frequency of 25 kHz.

Then, according to the present invention, the pulse signal from the driving duty deciding comparator CMP fluctuates based on the basic frequency of 25 kHz in accordance with changes in the detected temperature voltage VTH and the starting duty setting voltage RMI as described later. This fluctuation changes the ON/OFF operations of the bipolar transistors 102, 104 and the bipolar transistors 108, 110 to control the driving duty of the single-phase motor.

A hall device 116 is fixed to a predetermined position opposite a magnet on the rotor side of the single-phase motor, and biased by a constant voltage. The hall device 116 outputs a sine-wave signal in accordance with a revolution position of the single-phase motor, i.e., a change in the magnetic pole of the opposite rotor side.

A comparator circuit 118 has hysteresis characteristics for preventing chattering, and uses the sine-wave signal from the hall device 116 as a rectangular wave signal. The rectangular wave signal is a commutation signal which is a basis for switching the driving current of the single-phase coil 106 to any one of the a and b directions.

A revolution stop detection circuit 122 includes a capacitor 124, a constant current source 126, an NPN type bipolar transistor 128, a comparator circuit 130 and a reference voltage VREF, and detects revolution or stop of the single-phase motor. Herein, the capacitor 124 and the constant current source 126 constitute a charging circuit, and the capacitor 124 and the bipolar transistor 128 constitute a discharging circuit. As a result, a charge/discharge voltage having a saw-tooth shape appears on an ungrounded side of the capacitor 124. A− (inverting input) terminal of the comparator circuit 130 is connected to the reference voltage VREF, while a + (non-inverting input) terminal is connected to the ungrounded side of the capacitor 124. That is, the comparator circuit 130 compares the voltage on the ungrounded side of the capacitor 124 with the reference voltage VREF in size to output a detection signal which becomes "L" during the revolution of the single-phase motor, and "H" during the stop of the single-phase motor.

The output from the revolution stop detection circuit 122 is supplied to a starting duty setting voltage generation circuit (section for generating starting duty setting voltage) 200. This starting duty setting voltage generation circuit 200 includes an NPN type bipolar transistor (switching device) Tr1, and a charge/discharge circuit connected to the outside. The charge/discharge circuit includes a power source Vcc, a capacitor C1 and voltage-dividing resistors R1, R2. The capacitor C1 is connected in parallel to the voltage-dividing resistor R1. A parallel circuit constituted of the capacitor C1 and the voltage-dividing resistor R1, and the voltage-dividing resistor R2 are serially connected between the power source Vcc and the ground Vss. With respect to the bipolar transistor Tr1, an output voltage of the revolution stop detection circuit 122 is applied to its base, and its emitter is grounded. A collector of the bipolar transistor Tr1 is connected to a connection point between the parallel circuit, constituted of the capacitor C1 and the voltage-dividing resistor R1, and the voltage-dividing resistor R2. A starting duty setting voltage RMI is generated at the connection point. That is, a voltage between terminals of the capacitor C1 becomes a starting duty setting voltage RMI.

A thermistor Rs and a resistor R3 are serially connected between the power source Vcc and the ground Vss to constitute a detected temperature voltage generation circuit (section for generating detected temperature voltage) 300. The thermistor Rs is attached to a housing of a fan in order to detect an ambient temperature of the fan driven by the single-phase motor. A detected temperature voltage VTH which reflects the ambient temperature of the fan is generated at a connection point between the thermistor Rs and the resistor R3. The thermistor Rs has a negative temperature coefficient, and the detected temperature voltage VTH is reduced when a temperature rises in the housing.

The output voltage VTH from the detected temperature voltage generation circuit 300, the output voltage RMI from the starting duty setting voltage generation circuit 200, and a triangular wave signal (saw-tooth voltage) PWM from a PWM circuit (section for generating saw-tooth voltage) are inputted to a driving duty deciding comparator CMP. This driving duty deciding comparator (controller for outputting control signal to drive the single-phase motor) CMP includes a 3-differential (3-input) comparator. The PWM circuit (PWM in FIG. 1) outputs a triangular wave signal PWM as a PWM control signal in order to control a revolution speed of the single-phase motor.

Figure 2:
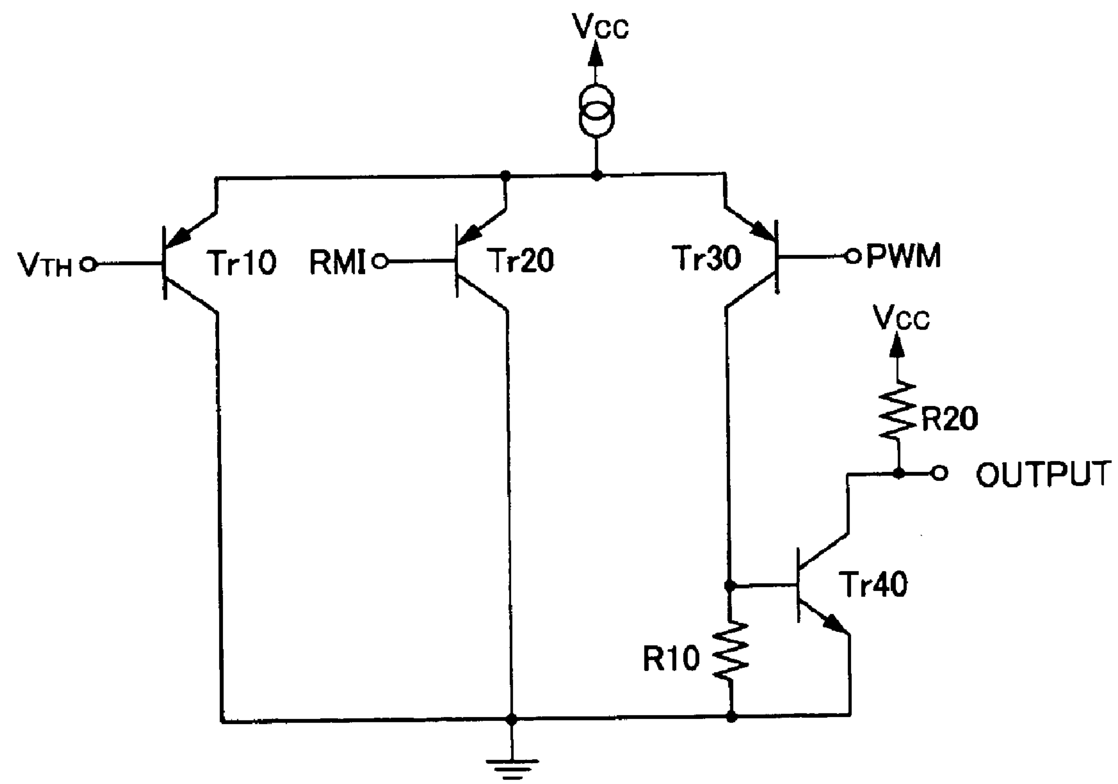
FIG. 2 is a circuit diagram showing a specific constitutional example of a 3-input comparator of the embodiment of the invention.

As a specific constitutional example, as shown in a circuit diagram of FIG. 2, the driving duty deciding comparator CMP includes a constant current source, three PNP type bipolar transistors Tr10, Tr20, Tr30, one NPN type bipolar transistor Tr40, a bias resistor R10, and a resistor R20. Emitters of the three bipolar transistors Tr10, Tr20, Tr30 are connected to the constant current source. Collectors of the two bipolar resistors Tr10, Tr20 are grounded. The bias resistor R10 is connected between a base and an emitter of the bipolar transistor Tr40, and a connection point between this emitter and the bias resistor R10 is grounded. A collector of the bipolar transistor Tr30 is connected to the base of the bipolar transistor Tr40. The power source Vcc is connected through the resistor R20 to a collector of the bipolar transistor Tr40.

In the driving duty deciding comparator CMP of the aforementioned constitution, a detected temperature voltage VTH is applied to the base of the bipolar transistor Tr10. A starting duty setting voltage RMI is applied to the base of the bipolar transistor Tr20. A triangular wave signal PWM is applied to the base of the bipolar transistor Tr30. An output signal of the driving duty deciding comparator CMP appears as a driving duty control signal at the collector of the bipolar transistor Tr40.

A logic circuit (logic section for generating a driving signal based on control signal and outputting the generated driving signal to the single-phase motor) 132 executes signal processing based on outputs of the driving duty deciding comparator CMP and the comparator circuit 118. As a result, as described above, the logic circuit 132 outputs driving signals A, B, C, D to complementarily turn ON/OFF the bipolar transistors 102, 104 and the bipolar transistors 108, 110.

The circuit shown in FIG. 1 can be constituted of one integrated circuit excluding the detected temperature voltage generation circuit 300. However, a constitution can be employed in which the portion of the aforementioned charge/discharge circuit (or only capacitor C1) of the starting duty setting voltage generation circuit 200 is externally attached.

Operation of Single-Phase Motor Driving Circuit

Description will be made for a characteristic operation of the single-phase motor driving circuit of the embodiment by referring to the circuit diagram of FIG. 2 and the waveform chart of FIG. 3.

First, a control principle of a driving duty will be described by referring to the waveform chart of FIG. 3. The waveform chart of FIG. 3 is a conceptual view for easy explanation of the operation.

As shown in periods T0, T0' of FIG. 3, a starting duty setting voltage RMI is increased with time at the time of starting the single-phase motor which is a driving target, while a voltage smaller than a detected temperature voltage VTH is set as an initial value. That is, at the initial time of starting (at the time of supplying power), a voltage (starting duty setting voltage RMI) between the terminals of the capacitor C1 is zero. At the time of restarting, since a voltage on the ungrounded side of the capacitor 124 is larger than the reference voltage VREF, an output of the comparator circuit 130 becomes "H" to turn ON the bipolar transistor Tr1. As a result, a voltage (starting duty setting voltage RMI) between the terminals of the capacitor C1 is also zero at the time of restarting.

The driving duty deciding comparator CMP compares the starting duty setting voltage RMI with the detected temperature voltage VTH. Any of the starting duty setting voltage RMI or the detected temperature voltage VTH, which is found to be smaller as a result of the comparison, is set as a duty setting voltage. Then, as shown in the waveform chart of the comparator output in FIG. 3, the driving duty deciding comparator CMP outputs a control signal of "H" only in a period in which the triangular wave signal PWM is larger than the duty setting voltage.

That is, the starting duty setting voltage RMI is smaller than the detected temperature voltage VTH during the starting of the single-phase motor which is the driving target (periods T0, T0' of FIG. 3). In this case, the driving duty deciding comparator CMP sets the starting duty setting voltage RMI as a duty setting voltage. As a result, the driving duty deciding comparator CMP outputs a control signal only in the period in which the triangular wave signal PWM is larger than the starting duty setting voltage RMI. Thus, compared with the conventional case in which a lowest speed setting voltage is a duty setting voltage, it is possible to increase a pulse width of the output of the driving duty deciding comparator CMP. Therefore, at the time of starting the single-phase motor, a driving duty can be set large to enable starting of the single-phase motor.

By setting an initial value (about 0 V in FIG. 3) of the starting duty setting voltage RMI smaller than a minimum value of the triangular wave signal, it is possible to surely start the single-phase motor by a maximum driving duty at the initial starting stage of the period T0 in FIG. 3.

Subsequently, the starting duty setting voltage RMI is gradually increased as the time passes. Then, as shown in a period T1 of FIG. 3, when the starting duty setting voltage RMI becomes a certain maximum value (lowest speed setting voltage in FIG. 3), the driving duty deciding comparator CMP outputs a control signal of a narrowest pulse width in order to revolve the single-phase motor at a lowest revolution speed for the time of a low temperature.

The certain maximum value of the starting duty setting voltage RMI, i.e., the lowest speed setting voltage, can be properly set by changing a capacity value of the capacitor C1 in the starting duty setting voltage generation circuit 200 of FIG. 1. As it is not involved in the driving duty at the time of starting, the lowest speed setting voltage can be set lower compared with the conventional case to enable a further reduction in a lowest revolution speed.

A temperature rise caused by the revolution of the single-phase motor is accompanied by a gradual reduction in the detected temperature voltage VTH. Thus, when the starting duty setting voltage RMI passes through a cross point in FIG. 3 to become larger than the detected temperature voltage VTH (period T2, PWM control variable speed area in FIG. 3), the driving duty deciding comparator CMP switches the duty setting voltage to the detected temperature voltage VTH. As a result, the driving duty deciding comparator CMP outputs a control signal only in a period in which the triangular wave signal PWM is larger than the detected temperature voltage VTH. In other words, the single-phase motor is revolved by a driving duty in accordance with the detected temperature VTH of the thermistor Rs.

When the temperature rise caused by the revolution of the single-phase motor progresses, and the detected temperature VTH of the thermistor Rs becomes high (period T3, full speed area in FIG. 3), a control signal outputted from the driving duty deciding comparator CMP becomes full driving of a duty 100%.

Next, description will be made for an operation of the circuit device which realizes the foregoing driving duty control principle.

Description will be made of a process from the starting (or restarting) of the single-phase motor in a stopped state to the driving by the driving duty in accordance with the detected temperature VTH of the thermistor Rs (periods T0, T1 in FIG. 3). As shown in FIG. 2, the output voltage (detected temperature voltage) VTH and the triangular wave signal PWM have been respectively inputted from the detected temperature voltage generation circuit 300 and the PWM to the driving duty deciding comparator CMP. In addition, the output voltage (starting duty setting voltage) RMI has been inputted from the starting duty setting voltage generation circuit 200 to the comparator CMP.

As shown in FIG. 3, the starting duty setting voltage RMI is changed with time at the time of starting. That is, a detection signal outputted from the revolution stop detection circuit 122 of FIG. 1 is changed from "H" indicating the stop of the single-phase motor to "L" indicating the revolution of the single-phase motor. This detection signal "L" is applied to the base of the bipolar transistor Tr1 of the starting duty setting voltage generation circuit 200 in FIG. 1, and the bipolar transistor Tr1 is switched from an ON state to an OFF state.

That is, first, in the stopped state of the single-phase motor, as shown in FIG. 1, the capacitor C1 is in a discharged state since the bipolar transistor Tr1 is in the ON state. Thus, for the starting duty setting voltage RMI inputted to the comparator CMP, only a low voltage (about 0 V in FIG. 3) of an ON resistance portion of the bipolar transistor Tr1 is generated. This voltage V1 is an initial value of the starting duty setting voltage.

In the process from the stopped state to a starting state through application of the triangular wave signal PWM to the base of the bipolar transistor Tr30, the detected temperature voltage VTH is applied to the base of the bipolar transistor Tr10, and the starting duty setting voltage RMI is applied to the base of the bipolar transistor Tr20. At this time, as shown in FIG. 3, the starting duty setting voltage RMI is much lower than the detected temperature voltage VTH. Thus, the bipolar transistor Tr10 to the base of which the detected temperature voltage VTH is applied is turned OFF, while the bipolar transistor Tr20 to the base of which the starting duty setting voltage RMI is applied is turned ON. Then, the bipolar transistor Tr30 to the base of which the triangular wave signal PWM is applied is turned OFF in the period in which the triangular wave signal PWM is larger than the starting duty setting voltage RMI. As a result, the bipolar transistor Tr40 at the collector of which the output of the comparator CMP appears outputs a signal of "H" in the period in which the triangular wave signal PWM is larger than the starting duty setting voltage RMI. As shown in the waveform chart of FIG. 3, at the initial starting stage of the period T0, the starting duty setting voltage RMI is smaller than the minimum value of the triangular wave signal PWM. Thus, the single-phase motor starts driving by a full duty.

At the same time, the switching of the bipolar transistor Tr1 in FIG. 1 to the OFF state is accompanied by starting of charging of the capacitor C1 which has been in the discharged state. Then, as the voltage between the terminals of the capacitor C1 transitionally rises, the starting duty setting voltage RMI inputted to the comparator CMP is gradually increased. A degree of this increase can be set based on a capacity of the capacitor C1 and values of the voltage-dividing resistors R1, R2 which constitute the charge/discharge circuit. In the periods T0, T0', T1 in the process of this increase, the starting duty setting voltage RMI is still smaller than the detected temperature voltage VTH. Thus, the bipolar transistor Tr10 to the base of which the detected temperature voltage VTH is applied is kept OFF, while the bipolar transistor Tr20 to the base of which the starting duty setting voltage RMI is applied is kept ON. Then, the bipolar transistor Tr30 to the base of which the triangular wave signal PWM is applied is turned OFF in the period in which the triangular wave signal PWM is larger than the starting duty setting voltage RMI, and turned ON in the period in which the triangular wave signal PWM is smaller than the starting duty setting voltage RMI. As a result, the bipolar transistor Tr40 at the collector of which the output of the comparator CMP appears outputs a signal of "H" in the period in which the triangular wave signal PWM is larger than the starting duty setting voltage RMI, and outputs a signal of "L" in the period in which the triangular wave signal PWM is smaller than the starting duty setting voltage RMI. Thus, the comparator CMP outputs a pulse signal in which the period of "H" becomes shorter as the starting duty setting voltage RMI rises.

Then, as shown in the periods T2, T3 of FIG. 3, when the starting duty setting voltage RMI becomes larger than the detected temperature voltage VTH after the completion of charge of the capacitor C1, the bipolar transistor Tr10 to the base of which the detected temperature voltage VTH is applied is kept ON, while the bipolar transistor Tr20 to the base of which the starting duty setting voltage RMI is applied is turned OFF.

Then, the bipolar transistor Tr30 to the base of which the triangular wave signal PWM is applied is turned OFF in the period in which the triangular wave signal PWM is larger than the detected temperature voltage VTH, and turned ON in the period in which the triangular wave signal PWM is smaller than the detected temperature voltage VTH. As a result, the bipolar transistor Tr40 at the collector of which the output of the comparator CMP appears outputs a signal of "H" in the period in which the triangular wave signal PWM is larger than the detected temperature voltage VTH, and outputs a signal of "L" in the period in which the triangular wave signal PWM is smaller than the detected temperature voltage VTH. Thus, the comparator CMP outputs a pulse signal in accordance with the detected temperature voltage VTH of the thermistor Rs.

If the rotor of the single-phase motor is locked, since no discharge pulse is generated from the logic circuit 132, the voltage between the terminals of the capacitor 124 becomes larger than the reference voltage VREF. As a result, the bipolar transistor Tr1 is turned ON, and the voltage between the terminals of the capacitor C1 (staring duty setting voltage RMI) becomes zero. Thus, at the time of restarting, the single-phase motor starts driving by a full duty similarly to the case at the time of supplying power.

When starting the single-phase motor, the single-phase motor can be started (restarted) based on the starting duty setting voltage. Thus, irrespective of a driving duty at the time of starting, a minimum value of the driving duty can be set as small as possible in order to revolve the single-phase motor at a lowest speed after the starting.

Although the preferred embodiment of the present invention has been described in detail, it should be understood that various changes, substitutions and alterations can be made therein without departing from spirit and scope of the inventions as defined by the appended claims.

It is claimed:

1. A single-phase motor driving circuit comprising:

a controller for outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than said detected temperature voltage at the time of starting said single-phase motor is set as an initial value, wherein said controller sets said duty setting voltage as said starting duty setting voltage when said result of the comparison shows that said starting duty setting voltage is smaller than said detected temperature voltage, and said controller sets said duty setting voltage as said detected temperature voltage when said starting duty setting voltage is larger than said detected temperature voltage.

2. The single-phase motor driving circuit according to claim 1, wherein said controller is constructed in an integrated circuit.

3. The single-phase motor driving circuit according to claim 1, further comprising:

a section for generating said detected temperature voltage;

a section for generating said starting duty setting voltage; and a section for generating said saw-tooth voltage.

4. The single-phase motor driving circuit according to claim 1, wherein said initial value of said starting duty setting voltage is smaller than a minimum value of said saw-tooth voltage.

5. The single-phase motor driving circuit according to claim 2, further comprising:

a section for generating said detected temperature voltage;

a section for generating said starting duty setting voltage; and a section for generating said saw-tooth voltage.

6. The single-phase motor driving circuit according to claim 2, wherein said initial value of said starting duty setting voltage is smaller than a minimum value of said saw-tooth voltage.

7. The single-phase motor driving circuit according to claim 3, wherein said initial value of said starting duty setting voltage is smaller than a minimum value of said saw-tooth voltage.

8. The single-phase motor driving circuit according to any one of claims 3 through 7, wherein said section for generating the starting duty setting voltage includes at least a capacitor, a power source is connected to one end of said capacitor and a switching device is connected to the end, said switching device is turned ON to discharge electricity from said capacitor when said single-phase motor is stopped, said switching device is turned OFF to start charging said capacitor from said power source when said single-phase motor is started, and a transitional rising voltage, which appears in said end of said capacitor in said charging step, is said starting duty setting voltage.

9. The single-phase motor driving circuit according to any one of claims 1 through 7, further comprising a logic section for generating a driving signal based on said control signal and outputting the generated driving signal to said single-phase motor.

10. The single-phase motor driving circuit according to claim 8, further comprising a logic section for generating a driving signal based on said control signal and outputting the generated driving signal to said single-phase motor.

11. A single-phase motor driving method comprising the steps of:

outputting a control signal to drive a single-phase motor in a period in which a saw-tooth voltage of a predetermined cycle is larger than a duty setting voltage based on a result of comparing a detected temperature voltage changed based on a temperature detected by a temperature detecting device with a starting duty setting voltage increased with time while a voltage smaller than said detected temperature voltage at the time of starting said single-phase motor is set as an initial value;

setting said duty setting voltage as said starting duty setting voltage when said result of the comparison shows that said starting duty setting voltage is smaller than said detected temperature voltage; and setting said duty setting voltage as said detected temperature voltage when said starting duty setting voltage is larger than said detected temperature voltage.

* * * * *